(12) United States Patent
Litherland et al.

(10) Patent No.: US 10,643,154 B2
(45) Date of Patent: May 5, 2020

(54) TRANSFORMING ATTRIBUTES FOR TRAINING AUTOMATED MODELING SYSTEMS

(71) Applicant: EQUIFAX INC., Atlanta, GA (US)

(72) Inventors: Trevis J. Litherland, Cumming, GA (US); Li Hao, Mesa, AR (US); Rajkumar Bondugula, Marietta, GA (US)

(73) Assignee: Equifax Inc., Atlanta, GA (US)

( * ) Notice: Subject to any disclaimer, the term of this patent is extended or adjusted under 35 U.S.C. 154(b) by 0 days.

(21) Appl. No.: 16/334,190

(22) PCT Filed: Sep. 21, 2017

(86) PCT No.: PCT/US2017/052659
§ 371 (c)(1),
(2) Date: Mar. 18, 2019

(87) PCT Pub. No.: WO2018/057701
PCT Pub. Date: Mar. 29, 2018

(65) Prior Publication Data
US 2019/0205791 A1    Jul. 4, 2019

Related U.S. Application Data

(60) Provisional application No. 62/397,471, filed on Sep. 21, 2016.

(51) Int. Cl.
*G06N 20/00* (2019.01)
*G06N 7/00* (2006.01)
(Continued)

(52) U.S. Cl.
CPC ............. *G06N 20/00* (2019.01); *G06N 7/005* (2013.01); *G06N 3/08* (2013.01); *G06N 5/003* (2013.01); *G06N 20/10* (2019.01)

(58) Field of Classification Search
CPC .............................. G06N 20/00; G06N 7/005
See application file for complete search history.

(56) References Cited

U.S. PATENT DOCUMENTS 8,214,308 B2    7/2012  Chu
8,515,862 B2 *  8/2013  Zhang .................... G06Q 40/00
                                                   705/38
(Continued)

FOREIGN PATENT DOCUMENTS

WO    2018057701    3/2018

OTHER PUBLICATIONS

Qin et al., "Principal Feature Selection and Fusion Method for Image Steganalysis," in 18(3) J. Electronic Imaging 033009 (2009). (Year: 2009).*

(Continued)

*Primary Examiner* — Kamran Afshar
*Assistant Examiner* — Ryan C Vaughn
(74) *Attorney, Agent, or Firm* — Kilpatrick Townsend & Stockton LLP

(57) ABSTRACT

In some aspects, a machine-learning model, which can transform input attribute values into a predictive or analytical output value, can be trained with training data grouped into attributes. A subset of the attributes can be selected and transformed into a transformed attribute used for training the model. The transformation can involve grouping portions of the training data for the subset of attributes into respective multi-dimensional bins. Each dimension of a multi-dimensional bin can correspond to a respective selected attribute. The transformation can also involve computing interim predictive output values. Each interim predictive output value can be generated from a respective training data portion in a respective multi-dimensional bin. The transformation can also involve computing smoothed interim output (Continued)

values by applying a smoothing function to the interim predictive output values. The transformation can also involve outputting the smoothed interim output values as a dataset for the transformed attribute.

20 Claims, 5 Drawing Sheets

(51) Int. Cl.
　　　*G06N 20/10*　　　(2019.01)
　　　*G06N 5/00*　　　(2006.01)
　　　*G06N 3/08*　　　(2006.01)

(56) References Cited

U.S. PATENT DOCUMENTS

| | | |
|---|---|---|
| 2003/0212691 A1 | 11/2003 | Kuntala et al. |
| 2005/0149463 A1 | 7/2005 | Bolt et al. |
| 2006/0167655 A1 | 7/2006 | Barrow et al. |
| 2008/0275901 A1* | 11/2008 | Chakrabarti .......... G06F 16/951 |
| 2008/0279434 A1 | 11/2008 | Cassill |
| 2009/0327176 A1 | 12/2009 | Teramoto |
| 2012/0166370 A1 | 6/2012 | Hu et al. |
| 2012/0197608 A1 | 8/2012 | Pinto et al. |
| 2013/0103624 A1 | 4/2013 | Thieberger |
| 2015/0339572 A1 | 11/2015 | Achin et al. |
| 2015/0379428 A1 | 12/2015 | Dirac et al. |
| 2016/0225073 A1 | 8/2016 | Xiao et al. |
| 2016/0267397 A1 | 9/2016 | Carlsson |

OTHER PUBLICATIONS

Famili et al., "Data Preprocessing and Intelligent Data Analysis," in 1 Intelligent Data Analysis 1 3-23 (1997). (Year: 1997).*
Liu et al., "A Spearman Correlation Coefficient Ranking for Matching-score Fusion on Speaker Recognition," in TENCON 2010—2010 IEEE Region 10 Conf. 736-741 (2010). (Year: 2010).*
Werner et al., "The Study of Preprocessing Methods' Utility in Analysis of Multidimensional and Highly Imbalanced Medical Data," in Proc. 11th Intl. Conf. IIIS 1-17 (2016). (Year: 2016).*
Leeuw De et al., "Isotone Optimization in R: Pool-Adjacent-Violators Algorithm (PAVA) and Active Set Methods", Department of Statistics University of California, Los Angeles, 24 pages.
Dykstra et al., "An Algorithm for Isotonic Regression for Two or More Independent Variables", The Annals of Statistics 1982, vol. 10, No. 3, 708-716, 9 pages.
U.S. Information Solutions, "Equifax Dimensions", 16-2702_USISGEN_Update Equifax Dimensions Materials, 2 pages.
Equifax, "Advanced Decisioning Attributes", Consumer Information Solutions, EFX-00151-6-13, 2 pages.
AU2017330333, "First Examination Report", dated Jun. 14, 2019, 6 pages.
CA3,037,346, "Office Action", dated Apr. 17, 2019, 4 pages.
CA3,037,346, "Office Action", dated Aug. 23, 2019, 7 pages.
EP17853865.8, "Extended European Search Report", dated Oct. 17, 2019, 12 pages.
PCT/US2017/052659, "International Search Report and Written Opinion", dated Dec. 21, 2017, 10 pages.
PCT/US2017/052659, "International Preliminary Report on Patentability", dated Apr. 4, 2019, 6 pages.

* cited by examiner

TRANSFORMING ATTRIBUTES FOR TRAINING AUTOMATED MODELING SYSTEMS

CROSS REFERENCE TO RELATED APPLICATIONS

This disclosure claims the benefit of priority of U.S. Provisional Application No. 62/397,471, titled "Transforming Attributes for Training Automated Modeling Systems" and filed on Sep. 21, 2016, which is hereby incorporated in its entirety by this reference.

TECHNICAL FIELD

This disclosure generally relates to digital data processing systems and methods for emulation of decision-making and other intelligence, and more particularly relates to transforming or otherwise deriving attributes used for training or otherwise configuring automated modeling systems.

BACKGROUND

Automated modeling systems implement automated modeling algorithms that are trained using large volumes of training data. Automated modeling algorithms can use modeling techniques such as logistic regression, neural networks, support vector machines, etc. The training data for training automated modeling algorithms can be generated by or otherwise indicate certain electronic transactions or circumstances. In a training process, these training data are analyzed by one or more computing devices of an automated modeling system. The training data are grouped into attributes that are provided as inputs to the automated modeling system. The automated modeling system can use this analysis to learn from and make predictions regarding similar electronic transactions or circumstances. For example, the automated modeling system uses the attributes to learn how to generate predictive outputs involving transactions or other circumstances similar to the attributes from the training data.

The accuracy with which an automated modeling algorithm learns to make predictions of future actions can depend on the data attributes used to train the automated modeling algorithm. For instance, larger amounts of training data allow the automated modeling algorithm to identify different scenarios that may affect a predictive output, to increase the confidence that a trend associated with the training data has been properly identified, or both. Thus, if an automated modeling algorithm uses, as inputs, a larger number of attributes having some predictive relationship with a predictive output, the accuracy of the predictive output increases.

However, certain constraints may reduce the number of attributes available to a given automated modeling algorithm. In one example, an automated modeling algorithm may be implemented on a mainframe or other computing system that prevents or hinders modifications to the programming that implements the automated modeling algorithm. Such a constraint may limit the types of attributes that may be provided to the automated modeling algorithm. In another example, computing systems may be constrained in the types of training data that may be provided to an automated modeling algorithm. An example of such a constraint is a monotonicity constraint, in which the training data for a given attribute must exhibit a monotonic relationship with the predictive output. Examples of a monotonic relationship between an attribute and a predictive output include a relationship in which a value of the predictive output increases as the value of the attribute increases or a relationship in which the value of the predictive output decreases as the value of the attribute increases.

These constraints on an automated modeling algorithm may cause certain attributes to be excluded from consideration when selecting attributes for training the modeling algorithm. Excluding these attributes may decrease the accuracy or effectiveness of the trained automated modeling algorithm.

SUMMARY

In some aspects, a machine-learning model, which can transform input attribute values into a predictive or analytical output value, can be trained with training data grouped into attributes. A subset of the attributes can be selected and transformed into a transformed attribute used for training the model. The transformation can involve grouping portions of the training data for the subset of attributes into respective multi-dimensional bins. Each dimension of a multi-dimensional bin can correspond to a respective selected attribute. The transformation can also involve computing interim predictive output values. Each interim predictive output value can be generated from a respective training data portion in a respective multi-dimensional bin. The transformation can also involve computing smoothed interim output values by applying a smoothing function to the interim predictive output values. The transformation can also involve outputting the smoothed interim output values as a dataset for the transformed attribute.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
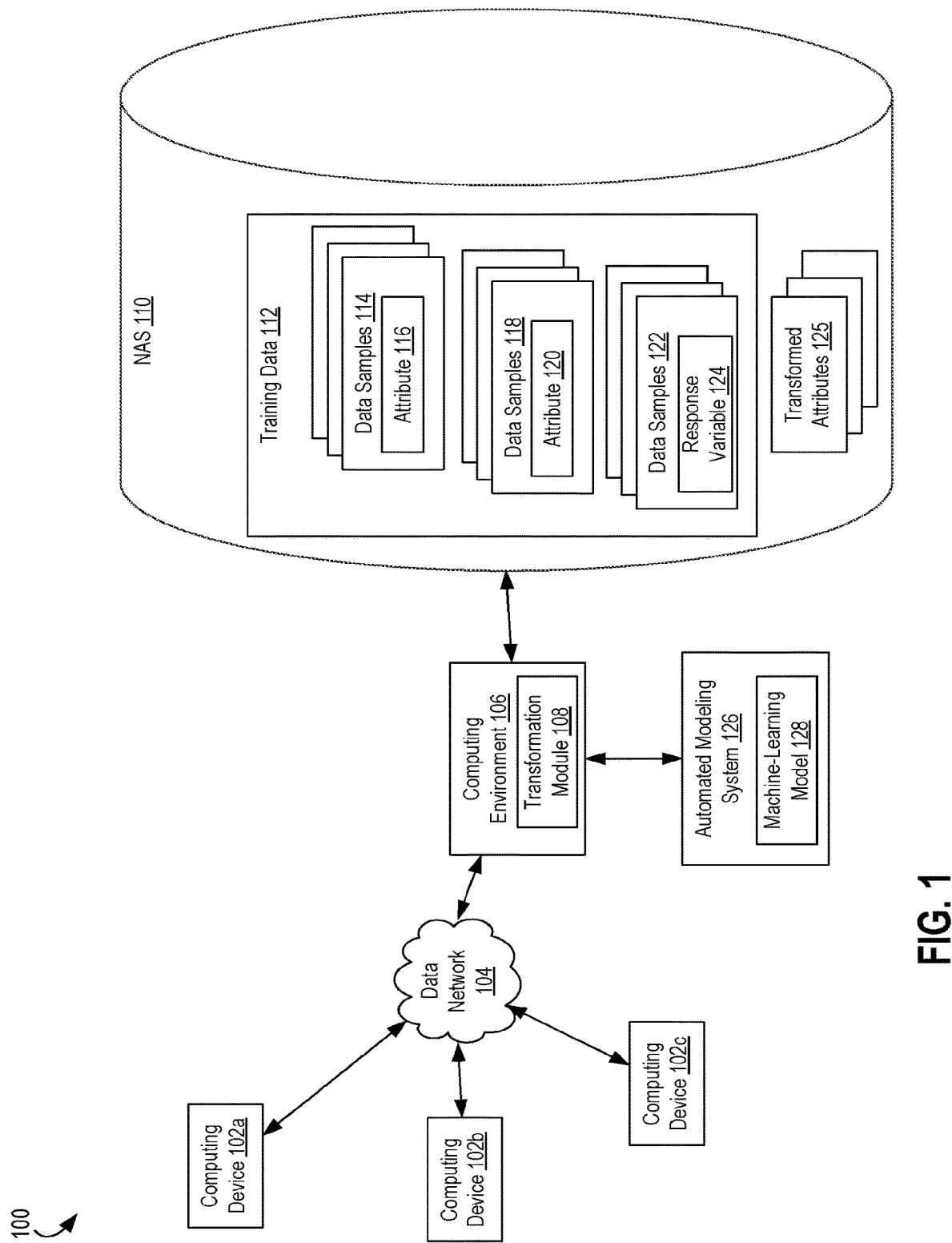
FIG. 1 depicts an example of a computing system that is usable for transforming attributes for training automated modeling algorithms or other machine-learning algorithms, according to some aspects of the present disclosure.

Certain aspects of this disclosure describe systems and methods for transforming or otherwise deriving attributes used for training automated modeling systems, such as digital data processing systems that can emulate decision-making and other intelligence, using training data that is grouped into attributes. For instance, certain attributes can indicate behaviors of individuals. However, a large number of attributes in a model can complicate the model, especially if the model is modified to capture interactions between subsets of attributes. In some aspects, automated modeling systems can be improved by creating a transformed (or derived) attribute from multiple individual attributes. The transformed attribute can indicate a joint impact of individual attributes on a certain response variable, such as a consumer credit risk computed from credit-related attributes. Such transformed attributes may replace the initial group of individual attributes in an automated modeling algorithm. Replacing the initial group of individual attributes in an automated modeling algorithm can simplify the model and preserve or exceed the power of existing modeling algorithms.

In some aspects, generating a transformed attribute can involve applying isotonic regression or another smoothing operation to an interim set of data. The interim set of data can be generated by combining or otherwise processing training data for the set of attributes that are used to generate the transformed attribute. For instance, if training data are generated by merely combining different attributes, these training data may not exhibit monotonicity. The lack of monotonicity can be addressed by applying isotonic regression or another smoothing operation to the transformed training data. Applying isotonic regression or another smoothing operation can cause the transformed training data for the transformed attribute to comply with monotonicity constraints. In other aspects, a monotonicity constraint may be absent. In certain aspects in which a monotonicity constraint is absent, the transformation process may omit an isotonic regression or other smoothing operation.

In some aspects, transformed training data can be used in place of initial training data for one or more original attributes. In one example, certain original attributes may be excluded from an automated modeling algorithm due to monotonicity constraints, may negatively impact the accuracy of the automated modeling algorithm due to noisy data or lack of data regarding inter-attribute interactions, or both. In this example, the transformed training data can be used in place of initial training data for these original attributes.

In additional or alternative aspects, transformed training data can be used in combination with at least some of the initial training data for one or more original attributes. For instance, although a monotonicity constraint may be absent in some aspects, the transformed training data can indicate interactions among the original attributes. The transformed training data, which indicates these interactions, can be used in combination with training data for the original attributes in an automated modeling algorithm.

In some aspects, the transformation operations described herein can improve an automated modeling system with respect to accuracy, computational efficiency, or both. For example, certain modeling systems may involve a monotonicity constraint. To satisfy monotonicity in the absence of the transformed attributes described herein, model developers may manually adjust the model coefficients, may implement a linearly constrained logistic regression, or both. Manually adjusting the model coefficients can be time-consuming and inaccurate, and implementing a linearly constrained logistic regression may be computationally inefficient. These inaccuracies and inefficiencies can be reduced or eliminated by applying one or more of the transformation methods described herein, which cause a model to comply with a monotonicity constraint. Furthermore, in some aspects, a transformed attribute that captures potential interactions between attributes can reduce or eliminate the need to manually add any interaction terms. For instance, without the transformation of attributes into transformed attributes, an automated modeling algorithm may not account for potential interaction between attributes. Alternatively, even if interaction terms can be added into a model to approximate the interactions, a small number of interaction terms will not be sufficient to accurately train an automated modeling algorithm, and too many interaction terms make the model extremely complex. Reducing the need to add interaction terms can avoid impacting the accuracy of a model, increasing the complexity of a model, or both. In this manner, a computing system can train automated modeling algorithms or algorithms involving machine-learning models in an improved manner.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Example of an Operating Environment for Transforming Attributes for Modeling Systems Referring now to the drawings, FIG. 1 depicts an example of a computing system 100 that is usable for transforming attributes for training automated modeling algorithms or other machine-learning algorithms. FIG. 1 depicts examples of hardware components of a computing system 100 according to some aspects. The computing system 100 is a specialized computing system that may be used for processing large amounts of data using a large number of computer processing cycles.

The computing system 100 may include a computing environment 106. The computing environment 106 may be a specialized computer or other machine that processes the data received within the computing system 100. The computing environment 106 may include one or more other systems. For example, the computing environment 106 may include a database system for accessing the network-attached data stores 110, a communications grid, or both. A communications grid may be a grid-based computing system for processing large amounts of data.

The computing system 100 may also include one or more network-attached data stores 110. The network-attached data stores 110 can include memory devices for storing training data 112 to be processed by the computing environment 106. (In some aspects, the network-attached data stores 110 can also store any intermediate or final data generated by one or more components of the computing system 100.) The training data 112 can be provided by one or more computing devices 102a-c, generated by computing devices 102a-c, or otherwise received by the computing system 100 via a data network 104.

The training data 112 can include data samples 114 having values for an attribute 116, data samples 118 having values for an attribute 120, and data samples 122 having values for a response variable 124. For example, a large number of observations can be generated by electronic transactions, where a given observation includes one or more attributes (or data from which an attribute can be computed or otherwise derived) and data for one or more response variables (or data from which a response variable value can be computed or otherwise derived). An automated modeling algorithm can use the training data 112 to learn relationships between attributes and one or more response variables.

Network-attached data stores 110 may also store a variety of different types of data organized in a variety of different ways and from a variety of different sources. For example, network-attached data stores 110 may include storage other than primary storage located within computing environment 106 that is directly accessible by processors located therein. Network-attached data stores 110 may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The computing environment 106 can include one or more processing devices that execute program code, which includes a transformation module 108 and is stored on a non-transitory computer-readable medium. The transformation module 108 can generate a transformed attribute 125 by applying one or more transformations to a group of attributes, such as a set of attributes 116 and 120. For example, the transformation module 108 can receive, via a network 104 or other suitable communication channel, various inputs that control or influence how to generate transformed attributes 125. Based on these inputs, the transformation module 108 can generate one or more transformed attributes 125. The inputs can include input variables (e.g., any number of consumer-level attributes such as Equifax® Advanced Decisioning Attributes ("ADA"), Equifax® Dimensions™ ("DIM") attributes, etc.), and a response variable. In some aspects, the transformation module 108 can also receive one or more inputs specifying how many attributes should be used to construct a transformed attribute. In additional or alternative aspects, the transformation module 108 can also receive, as inputs, one or more multicollinearity parameters that control or influence how many transformed attributes 125 are generated.

In some aspects, the transformed attribute 125 can be a set of transformed training data that satisfies a monotonicity constraint. In aspects involving a monotonicity constraint, the various inputs that control or influence how to generate transformed attributes 125 can include one or more inputs indicating the monotonicity constraint.

A transformed attribute 125 can capture or otherwise represent potential interactions between individual attributes (e.g., attributes 116, 120) used to generate the transformed attribute 125. In some aspects, the transformed attribute, by capturing high-dimensional comprehensive information derived from a group of attributes, can enhance the performance of an automated modeling algorithm, such as (but not limited to) a credit model. In additional or alternative aspects, incorporating transformed attributes 125 into an automated modeling algorithm can improve model performance. Model performance can be evaluated using Kolmogorov-Smirnov ("KS") scores, capture rates, or some combination thereof. Examples of use cases in which model performance can be improved include (but are not limited to) marketing-related use cases, fraud detection use cases, risk assessment use cases, etc.

The computing system 100 may also include one or more automated modeling systems 126. The computing environment 106 may route select communications or data to the automated modeling systems 126 or one or more servers within the automated modeling systems 126. An example of an automated modeling system 126 is a mainframe computer, a grid computing system, or other computing system that executes an automated modeling algorithm (e.g., an algorithm using logistic regression, neural networks, etc.) that can learn or otherwise identify relationships between attributes and response variables.

Automated modeling systems 126 can be configured to provide information in a predetermined manner. For example, automated modeling systems 126 may access data to transmit in response to a communication. Different automated modeling systems 126 may be separately housed from each other device within the computing system 100, such as computing environment 106, or may be part of a device or system. Automated modeling systems 126 may host a variety of different types of data processing as part of the computing system 100. Automated modeling systems 126 may receive a variety of different data from the computing devices 102a-c, from the computing environment 106, from cloud network, or from other sources.

An automated modeling system 126 can execute one or more automated modeling algorithms using one or more machine-learning models 128. One example of a machine-learning model 128 is logistic regression. Other examples of machine-learning models 128 include neural network, support vector machines, tree-based models etc. In some aspects, a machine-learning model includes one or more memory structures such as input nodes interconnected with one or more output nodes via intermediate nodes. In one example, input and output nodes of a neural network can be connected via one or more hidden layers of intermediate nodes. In another example, root nodes and terminal nodes of decision trees in a random forest model (or other tree-based model) can be connected by various decision nodes in the decision trees. Intermediate nodes (e.g., hidden layers of a neural network, decision nodes of a decision tree, etc.) can transform input attribute values into a predictive or analytical output value for an entity associated with the input attribute values.

The computing system 100 can also include one or more computing devices 102a-c. The computing devices 102a-c may include client devices that can communicate with the computing environment 106. For example, the computing devices 102a-c may send data to the computing environment 106 to be processed, may send signals to the computing environment 106 to control different aspects of the computing environment or the data it is processing. The computing devices 102a-c may interact with the computing environment 106 via one or more networks 104.

The computing devices 102a-c may include network computers, sensors, databases, or other devices that may transmit or otherwise provide data to computing environment 106. For example, the computing devices 102a-c may include local area network devices, such as routers, hubs, switches, or other computer networking devices.

The numbers of devices depicted in FIG. 1 are provided for illustrative purposes. Different numbers of devices may be used. For example, while each device, server, and system in FIG. 1 is shown as a single device, multiple devices may instead be used.

Each communication within the computing system 100 (e.g., between client devices, between automated modeling systems 126 and computing environment 106, or between a server and a device) may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer or transport layer security. In addition, data or transactional details may be encrypted.

Example of an Attribute Transformation Implementation

The following examples of transforming attributes are provided for illustrative purposes. These illustrative examples involve transforming credit-related attributes that are used by an automated modeling system to generate risk assessments (e.g., credit scores) or other predictive outputs regarding individuals or other entities. In automated modeling systems that use credit-related data, attributes can be incorporated as independent predictors into an automated model algorithm (e.g., a modeling algorithm that uses a logistic regression model). However, incorporating un-transformed attributes as independent predictors may not adequately account for interactions within groups of attributes (e.g., interactions between a "credit utilization" attribute and a "credit limit" attribute).

In some aspects, certain attributes for an automated modeling system may not satisfy monotonicity constraints imposed on automated modeling systems that are used for generating credit scores or other risk assessments. These constraints may be imposed by laws, regulations, or both that govern systems that generate credit scores or other risk assessments. In other aspects, monotonicity constraints may not be imposed on automated modeling systems.

The transformation module 108 can address one or more of the constraints identified above by generating a transformed attribute by applying one or more transformations to a group of attributes. The transformed attribute can represent the joint impact of the group of attributes on credit-related performance or other risk assessments. The transformed attribute can also capture potential interactions between individual attributes. In some aspects, the transformed attribute can capture high-dimensional, comprehensive information derived from a group of attributes. Capturing this information can enhance the performance of a credit model or other automated modeling algorithm.

In some aspects, an automated modeling algorithm, such as a credit model, may be subject to a monotonicity constraint. In these aspects, the transformed attribute includes a set of transformed training data that satisfies a monotonicity constraint. For example, the transformation module 108 can access training data 112 that are organized into attributes. The transformation module 108 can select, from these attributes, a subset of N attributes denoted as $A_1, A_2, \ldots, A_N$. The transformation module 108 can transform the subset of N attributes into a transformed attribute H. The transformed attribute H can indicate the joint impact of the attributes $A_1, A_2, \ldots, A_N$ on a consumer credit performance P or other behavior by an individual or industry. P may have a binary form. In one example, P=1 if a consumer has a "Bad" performance and P=0 otherwise.

In some aspects, the impact of the transformed attribute H on performance P can monotonically increase or decrease according to the value of the transformed attribute H. In other aspects, this monotonicity feature can be omitted.

Figure 2:
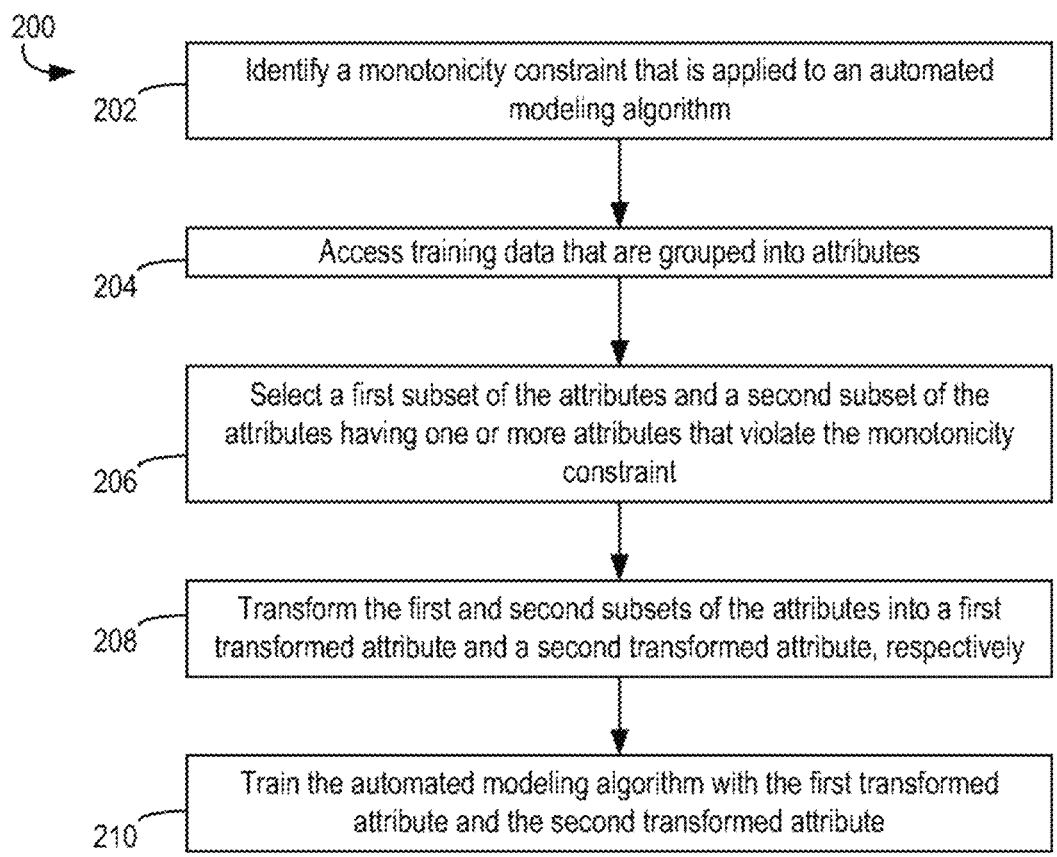
FIG. 2 depicts an example of a process for using transformed attributes provided as inputs for training or otherwise using an automated modeling algorithm, according to some aspects of the present disclosure.

FIG. 2 is a flow chart depicting an example of a process 200 for using transformed attributes that may be provided as inputs for training or otherwise using an automated modeling algorithm. For illustrative purposes, the process 200 is described with reference to the implementation depicted in FIG. 1 and various other examples described herein. However, other implementations are possible.

In some aspects, the process 200 can involve identifying a monotonicity constraint that is applied to an automated modeling algorithm, as depicted in block 202. For example, the transformation module 108 can be executed by one or more suitable processing devices. In other aspects, block 202 can be omitted.

In aspects involving a monotonicity constraint, block 202 can involve executing the transformation module 108 to identify an automated modeling system 126 to be trained using training data 112 or that will otherwise use attributes as inputs to an automated modeling algorithm. The identified automated modeling system 126 can be subject to the monotonicity constraint. The monotonicity constraint may be specified in an input received by the transformation module 108 from one of the computing devices 102a-c. In some aspects, one or more of the computing devices 102a-c can transmit data to the computing environment 106 that indicates the monotonicity constraint. The transformation module 108 can use these data to identify the monotonicity constraint.

The process 200 can also involve accessing training data, which are grouped into attributes, for training the automated modeling algorithm, as depicted in block 204. For example, the transformation module 108 can be executed by one or more suitable processing devices to access the training data 112. The training data 112 are grouped into multiple attributes, such as the attributes 116 and 120. Any number of suitable attributes can be included in the training data 112. In one example, a set of training data 112 can include data samples for 500 or more attributes. In another example, a set of training data 112 can include data samples for 1142 attributes. In some aspects, the training data 112 also include one or more response variables.

The process 200 can also involve selecting a first subset of the attributes and a second subset of the attributes, as depicted in block 206. For example, the transformation module 108 can be executed to select attributes 116 and 120 from a larger set of attributes into which the training data 112 is organized.

In some aspects, selecting the subsets of attributes can involve excluding certain attributes from consideration. The transformation module 108 can use one or more criteria for including or excluding certain attributes. Any suitable criterion or combination of criteria may be used.

One criterion that the transformation module 108 can use for including or excluding certain attributes is a correlation with a response variable. For example, one or more processing devices can execute the transformation module 108 to perform an exploratory data analysis. In the exploratory data analysis, the transformation module 108 can automatically analyze each attribute's associated training data to determine and summarize characteristics of each attribute (e.g., its trend). Analyzing the training data for an attribute can involve computing a correlation between the training data for the attribute and the training data for a response variable. If the computed correlation is exceeds a threshold correlation, which indicates that both training data subsets exhibit the same trend, the transformation module 108 may select the attribute for use in a transformation operation. If the computed correlation is too small (e.g., the two training data subsets exhibit different trends), the transformation module 108 may exclude the attribute from being used in a transformation operation.

Another criterion that the transformation module 108 can use for including or excluding certain attributes is a missing-values threshold. The transformation module 108 can identify a particular time period under consideration (e.g., a 30-day period), where the time period includes multiple intervals (e.g., the days of the 30-day period). The transformation module 108 can exclude a particular attribute based on a number of intervals with missing data values exceeding a threshold number of intervals. For example, one or more processing devices can execute the transformation module 108 to identify a number of missing data samples for an attribute (e.g., missing data values for the attribute in 15 days of a 30-day period). If the number of missing values for an attribute is less than the missing-values threshold, the transformation module 108 can select the attribute for use in a transformation operation. If the number of missing values for an attribute is greater than the missing-values threshold, the transformation module 108 may exclude the attribute from being used in a transformation operation.

Another criterion that the transformation module 108 can use for including or excluding certain attributes is a multicollinearity threshold. For example, one or more processing devices can execute the transformation module 108 to compute or otherwise determine a correlation between first training data for a first attribute and second training data for a second attribute. A greater magnitude of correlation (whether positive or negative) can indicate that two attributes exhibit a higher degree of multicollinearity. A lower magnitude of correlation can indicate that two attributes exhibit a lower degree of multicollinearity. If the multicollinearity is less than a threshold multicollinearity, the transformation module 108 may select the attribute for combination with another attribute in a transformation operation. If the multicollinearity is greater than a threshold multicollinearity, the transformation module 108 may not group the two attributes together via a transformation operation.

In some aspects, one or more attributes in the first subset of the attributes can violate the monotonicity constraint. In additional or alternative aspects, one or more attributes in the second subset of the attributes can also violate the monotonicity constraint.

The process 200 can also involve transforming the first subset of the attributes into a first transformed attribute and transforming the second subset of the attributes into a second transformed attribute, as depicted in block 208. For example, the transformation module 108 can be executed by one or more processing devices to transform the attributes 116, 120 into a transformed attribute. The transformed attribute can comply with the monotonicity constraint. An example of a method for transforming multiple attributes into a common transformed attribute is described herein with respect to FIG. 3.

The process 200 can also involve training the automated modeling algorithm with the first transformed attribute and the second transformed attribute, as depicted in block 210. For example, the transformation module 108 can be executed by one or more processing devices to output a dataset of transformed data for the transformed attribute. The computing environment 106 can transmit the dataset of transformed data to the automated modeling system 126. The automated modeling system 126 can train an automated modeling algorithm by using the dataset of transformed data for the transformed attribute to modify a machine-learning model (e.g., a logistic regression, a neural network, a support vector machine, etc.).

In one example, the automated modeling algorithm can use a logistic regression having the first and second transformed attributes as inputs. Training this logistic regression can involve adjusting one or more coefficients of the logistic regression that are applied to input attributes (e.g., the first and second transformed attributes) such that predictive output values generated by the logistic regression match (or otherwise correspond to) data samples of response variables associated with the input attribute values.

In another example, the automated modeling algorithm can use a neural network having the first and second transformed attributes as input nodes. Training this neural network can involve adjusting features of the neural network, such as weights or numbers of layers or nodes, such that predictive output values generated by the neural network match (or otherwise correspond to) data samples of response variables associated with the input attribute values.

In some aspects, the process 200 can be used to generate multiple transformed (or otherwise derived) attributes, as described with respect to the example depicted in FIG. 2. However, any number of transformed attributes (e.g., one transformed attribute, more than two transformed attributes, etc.) can be generated using one or more operations described herein.

In some aspects, the process 200 can be used to improve automated modeling systems that use logistic regression models. Logistic regression models may be built using an assumption that individual attributes are independent variables. This assumption might not be satisfied in reality. Model performance may be improved if the interactions between individual attributes are captured. Furthermore, certain regulations (e.g., regulations governing credit-related models) might require monotonicity with respect to a response variable to be preserved. The process 200 can construct a transformed attribute from several individual attributes to represent their high-dimensional joint impact on the response variable. If monotonicity is required, isotonic regression or another smoothing algorithm can be applied to ensure monotonicity constraints are satisfied, as described herein with respect to FIG. 3.

Figure 3:
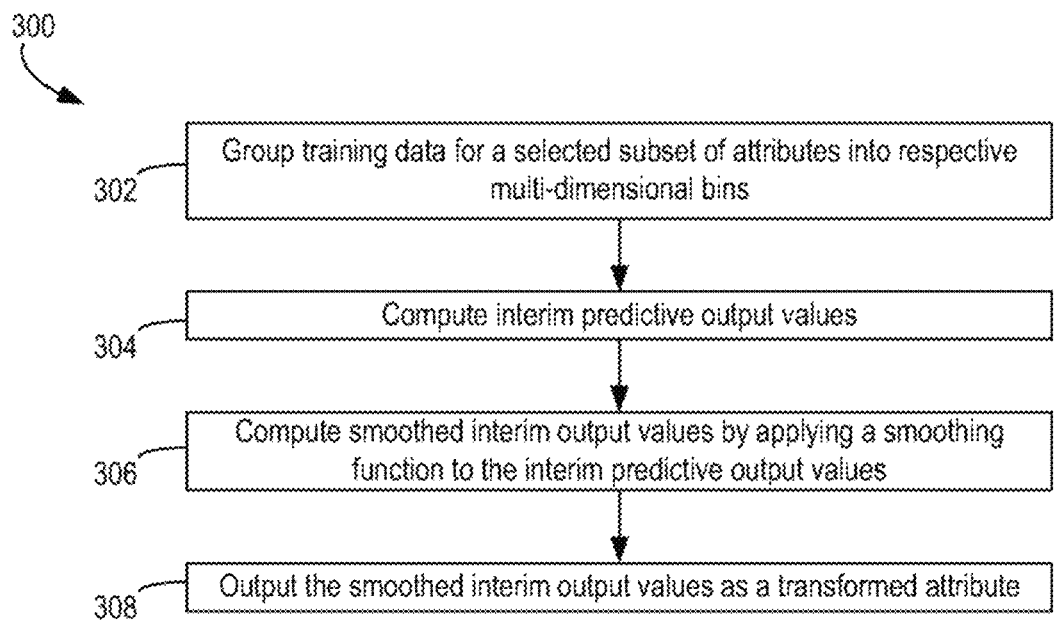
FIG. 3 depicts an example of a process for transforming attributes into a transformed attribute, according to some aspects of the present disclosure.

FIG. 3 is a flow chart depicting an example of a process 300 for transforming the attributes $A_1, A_2, \ldots, A_N$ into a transformed attribute H. For illustrative purposes, the process 300 is described with reference to the implementation depicted in FIGS. 1 and 2 and various other examples described herein. However, implementations are possible.

In block 302, the transformation module 108 can group training data for a selected subset of attributes into respective multi-dimensional bins. A multi-dimensional bin includes a portion of the training data. The portion of the training data includes a combination of different attribute value ranges for the selected subset of attributes. Each dimension for the multi-dimensional bin corresponds to a respective attribute from the subset of attributes.

In a simplified example, a subset of attributes may include two attributes, where each attribute has a range of values (e.g., 1-10) with multiple sub-ranges (e.g., 1-3, 3-5, 5-7, 7-10). A given multi-dimensional bin can be the training data for two intersecting sub-ranges from the two attributes. Thus, a first bin can be defined by training data within the "1-3" sub-range of the first attribute and the "1-3" sub-range of the second attribute, a second bin can be defined by training data within the "1-3" sub-range of the first attribute and the "3-5" sub-range of the second attribute, a third bin can be defined by training data within the "3-5" sub-range of the first attribute and the "3-5" sub-range of the second attribute, and so on.

For instance, the transformation module 108 can sort each attribute according to its value. The transformation module 108 can discretize the attribute into a certain number of discrete monotonic buckets. This discretization can allow the non-linear relationship between individual attributes and a response variable P to be captured. The transformation module 108 can create corresponding dummy variables based on the discrete monotonic buckets. A given attribute $A_n$ can be discretized into $M_n$ buckets. The transformation module 108 can use the buckets of the attribute $A_n$ to create dummy variables $A_{n,1}, \ldots, A_{n,M_n}$, for n in 1:N. The transformation module 108 can create each multi-dimensional bin from intersecting sets of dummy variables for the various attributes in the selected subset of attributes.

In a simplified example involving a two-dimensional bin, the selected subset of attributes includes two attributes, such as a credit limit attribute $A_1$ and a credit utilization attribute $A_2$. In this example, a training dataset includes data samples with a "credit utilization rate" attribute and a "credit limit" attribute, and further uses "90 day plus past due flag (90+ dpd) in the future 24 months" as a response variable. The training dataset can include approximately 1.5 million data samples.

In some aspects, monotonicity constraints can be applied to an automated modeling system that computes the response variable. For example, one monotonicity constraint is that the probability of having a "90+dpd" flag increases as the credit utilization rate increases. This means that consumers who spend more tend to be riskier. Another monotonicity constraint is that the probability of having a 90+dpd increases as the credit limit decreases. This means consumers who have higher credit limits have more established credit history and are less likely to default. In other aspects, monotonicity constraints can be omitted.

Each attribute can be divided into any suitable number of buckets. For instance, the credit limit attribute $A_1$ can be divided into ten buckets, each of which represents a range of credit limit values (e.g., >$50K, $34K-$50K, $25K-34K, etc.). The credit utilization attribute $A_2$ can be divided into ten buckets, each of which represents a range of credit utilization percentages (e.g., 0%-0.88%, 0.88%-2.98%, etc.). In some aspects, the numbers of buckets for the different attributes do not need to be equal. The ranges for the buckets do not need to be uniform for each bucket. For instance, one of the buckets can be "$34K-$50K," with a difference of $16,000 over the range represented by the bucket, and another one of the buckets can be "$25K-$34K," with a difference of $9,000 over the range represented by the bucket.

The dummy variables for the credit limit attribute $A_1$ can be $A_{1,1}, \ldots, A_{1,10}$, and the dummy variables for the credit limit attribute $A_2$ can be $A_{2,1}, \ldots, A_{2,10}$. One hundred multi-dimensional bins can be created from these dummy variables. For example, a first bin can be defined as ($A_{1,1}$, $A_{2,1}$), which corresponds to consumers in both the ">$50K" credit limit bucket and the "0%-0.88%" credit utilization bucket. A second bin can be defined as ($A_{1,1}$, $A_{2,2}$), which corresponds to consumers in both the ">$50K" credit limit bucket and the "0.88%-2.98%" credit utilization bucket.

In block 304, the transformation module 108 can compute interim predictive output values or other interim response variables. Each interim predictive output value or other interim response variable is generated from training data in a respective one of the multi-dimensional bins. Continuing with the example above, the transformation module 108 can compute probabilities of having a "bad" performance (e.g., being 90 or more days past due on a debt), denoted as Pr(P=1) for each of the 100 multi-dimensional bins. In this example, the probabilities are the interim predictive output values.

Figure 4:
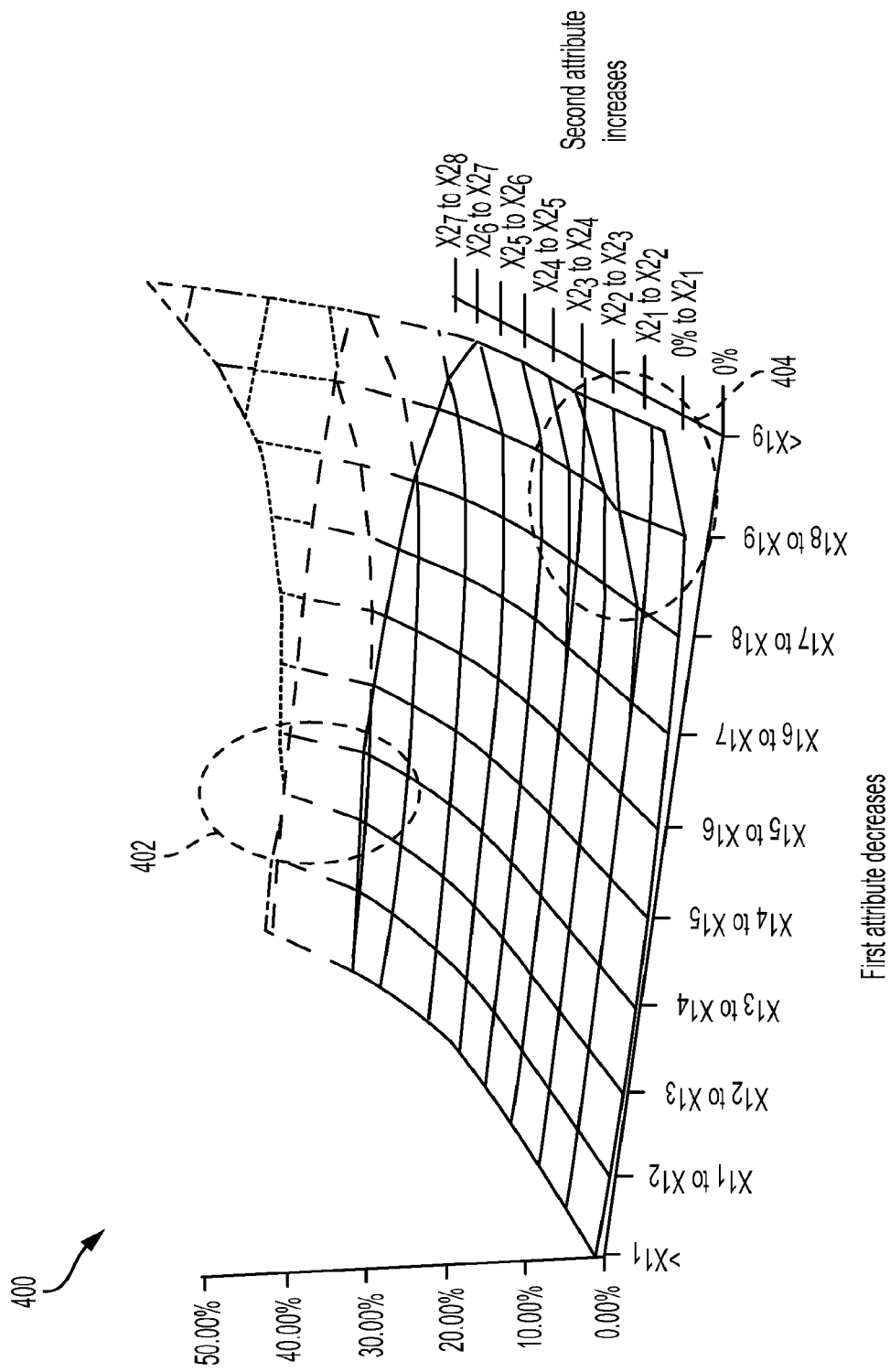
FIG. 4 depicts an example of a three-dimensional surface that corresponds to transformed attribute values generated using the process of FIG. 3, according to some aspects of the present disclosure.

FIG. 4 depicts an example of a three-dimensional space that is generated by the operations described with respect to blocks 302 and 304 and using an example of 1.5 million data samples. As depicted in FIG. 4, a three-dimensional space 400 includes a first axis for ten credit limit buckets (e.g., the buckets with ranges of "X1" attribute values that are dollar amounts for credit limits), a second axis for ten credit utilization buckets (e.g., the buckets with ranges of "X2" attribute values that are percentages of credit utilization), and a third axis for probabilities of a "bad" performance. The probabilities of a "bad" performance are computed for each bin without considering a monotonicity constraint. Thus, the resultant dataset of interim predictive output values depicted in FIG. 4 does not strictly satisfy monotonicity constraints due to data noise. For example, violations of the monotonicity constraint can be seen in the regions 402 and 404, which exhibit non-monotonic behavior. The non-monotonic behavior can be corrected by applying a smoothing function to the dataset depicted in FIG. 4.

In some aspects, a modeling function, modeling algorithm, or other analytical or predictive function is applied to each bin to compute the interim predictive output values. In the example depicted in FIG. 4, each bin can include multiple data samples, where each data sample indicates the credit limit, the credit utilization, and a probability of a bad performance. In some aspects, an averaging function is applied to each bin to generate the probability for the bin. For instance, the averaging function can find the average probability of the bad performance across all data samples in a bin.

In some aspects, the transformation module 108 can compute smoothed interim output values (or other smoothed interim response variables) by applying a smoothing function to the interim predictive output values, as depicted at block 306. Applying the smoothing function causes the smoothed interim predictive output values to comply with the monotonicity constraint. In other aspects, block 306 may be omitted.

In some aspects, the transformation module 108 uses isotonic regression as the smoothing function. Isotonic regression can determine an optimally weighted, least-square fit of a line to a vector according to a weight vector, subject to a constraint that the elements in the vector must be monotonically non-decreasing. One example of an iterative algorithm for solving an isotonic regression is the pool adjacent violators algorithm. The isotonic regression can output a set of output data values (e.g., data values defining a line or curve) that exhibit monotonicity and that closely reflect the input data values used to generate the output data values.

The use of isotonic regression by the transformation module 108 can be illustrated using a simple example. If an attribute $A_1$ is used to predict $Pr(P=1)$, the attribute $A_1$ is discretized into monotonic buckets and is used to create corresponding dummy variables $A_{1,1}, \ldots, A_{1,M_n}$. Each bucket includes a number of observations or other data samples from the training data. For each bucket, a weight is identified that corresponds to the number of data samples in the bucket. A weight vector $w=(w_1, \ldots w_{M_n})$ is identified, where $w_1$ is the weight for the first bucket, $w_2$ is the weight for the second bucket, and so on. In addition, the training data in the various buckets includes a number of data samples (e.g., observations) for which P=1. A vector $m=(m_1, \ldots, m_{M_n})$ represents the numbers of data samples for which P=1 in the various buckets, where $m_1$ is the number of data samples from the first bucket for which P=1, $m_2$ is the number of data samples from the second bucket for which P=1, and so on. The transformation module 108 can compute, for each bucket, a predicted probability that yields a minimum prediction error, which is a vector $$\hat{p} = \left(\frac{m_1}{w_1}, \ldots \frac{m_{M_n}}{w_{M_n}}\right).$$

The vector $\hat{p}$ may not satisfy a monotonicity requirement. The transformation module 108 applies isotonic regression to the vector $\hat{p}$ with the weight vector w to determine an optimal weighted-least square fit vector $\tilde{p}$ that satisfies monotonicity.

The transformation module 108 can similarly apply isotonic regression to the multi-dimensional bins, which are generated using blocks 302 and 304, by generalizing isotonic regression from a one-dimensional problem to a multi-dimensional problem. For example, the transformation module 108 can discretize the subset of N attributes $A_1, A_2, \ldots, A_N$ into various multi-dimensional bins. The discretization can yield $M_1 \times M_2 \times \ldots \times M_N$ multi-dimensional bins (e.g., 10×10 multi-dimensional bins in the two-attribute example used above). The portion of training data for the subset of N attributes $A_1, A_2, \ldots, A_N$ is divided into these multi-dimensional bins. The transformation module 108 can compute a predicted probability of Pr(P=1) for each multi-dimensional bin, similar to the one-dimensional example discussed above. However, for an N-dimensional space defined by the multi-dimensional bins of the N attributes, $\hat{p}$ is an N-dimensional matrix, rather than a vector as in the one-dimensional example.

The transformation module 108 can apply a multi-dimensional isotonic regression algorithm to compute an N-dimensional matrix of smoothed interim output values that satisfy a monotonicity constraint. Any suitable iterative algorithm for the multi-dimensional isotonic regression can be applied to the multi-dimensional bins that will converge to the global optimum. The result is an N-dimensional matrix of smoothed interim output values. The transformation module 108 can output the N-dimensional matrix of smoothed interim output values as the transformed attribute H, as depicted at block 308.

Figure 5:
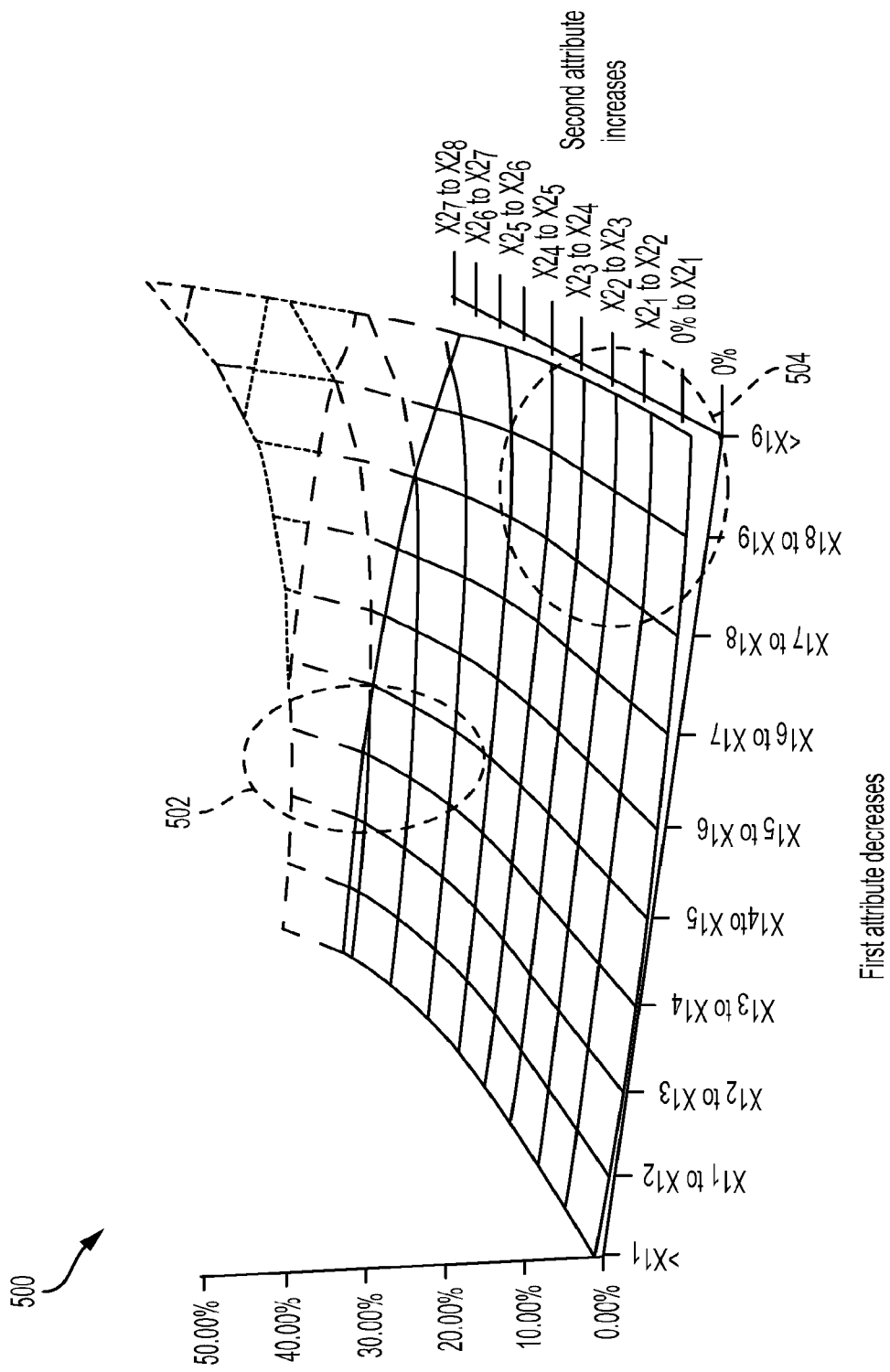
FIG. 5 depicts an example of a smoothed three-dimensional surface that corresponds to transformed attribute values generated using the process of FIG. 3, according to some aspects of the present disclosure.

FIG. 5 depicts an example of a three-dimensional space that is generated by the operations described with respect to blocks 306 and 308. As depicted in FIG. 5, a three-dimensional space 500 includes a first axis for first attribute buckets (e.g., credit limit), a second axis for second attribute buckets (e.g., credit utilization), and a third axis for probabilities of a "bad" performance or other outcome of interest.

In contrast to the regions 402 and 404 depicted in FIG. 4, which exhibit non-monotonic behavior, the smoothed regions 502 and 504 exhibit monotonic trends that satisfy a monotonicity constraint of an automated modeling algorithm.

In some aspects, the transformed attribute H captures some or all potential interactions between attributes in the selected subset of N attributes $A_1, A_2, \ldots, A_N$ by covering an N-dimensional solution space. The application of the isotonic regression algorithm can be computationally efficient, since the transformation module 108 uses an isotonic regression algorithm to perform optimization on $M_1 \times M_2 \times \ldots \times M_N$ data points instead of an entire set of training data. In some aspects involving a monotonicity constraint, the transformed attribute H satisfies a monotonicity constraint in each dimension, without requiring manual adjustment or additional optimization.

In additional or alternative aspects, using a transformed attribute H that captures some or all potential interactions between attributes in the selected subset of N attributes $A_1, A_2, \ldots, A_N$ can reduce or eliminate the need to manually add any interaction terms. For instance, without the transformation of attributes into transformed attributes, an automated modeling algorithm may not account for potential interaction between attributes. Alternatively, even if interaction terms can be added into a model to approximate the interactions, a small number of interaction terms will not be sufficient to accurately train an automated modeling algorithm, and too many interaction terms make the model extremely complex. Reducing the need to add interaction terms can avoid impacting the accuracy of a model, increasing the complexity of a model, or both.

In some aspects, using a transformed attribute H results in a system that provides greater accuracy and computational efficiency when training automated modeling algorithms. For example, certain modeling systems may involve a monotonicity constraint. In these examples, even if a modeling system uses binned attribute data for un-transformed attributes, a simple logistic regression cannot guarantee that model coefficients for the dummy variables, which represent the impact of attributes on P, will increase or decrease monotonically with respect to the discrete buckets. To satisfy monotonicity in the absence of the transformed attributes described herein, model developers may manually adjust the model coefficients, may implement a linearly constrained logistic regression, or both. Manually adjusting the model coefficients can be time-consuming and inaccurate, and implementing a linearly constrained logistic regression may be computationally inefficient. These inaccuracies and inefficiencies can be reduced or eliminated by applying one or more of the transformation methods described herein, thereby improving the operation of a computing system that trains automated modeling algorithms or other machine-learning algorithms.

In some aspects, the transformation module 108 can also access one or more input parameters that control or otherwise influence one or more transformation operations described herein with respect to FIGS. 2 and 3. One example of an input parameter is a dimension parameter, which can indicate how many individual attributes are used to construct one transformed attribute. For instance, a dimension parameter of "2" may result in 650,000 possible combinations, and a dimension parameter of "3" may result in over 2.5 million combinations. Another example of an input parameter is an indication of whether monotonicity is required. Another example of an input parameter is a missing-value threshold, which can be used to exclude an attribute from a transformation process if the attribute has more missing values than the threshold. Another example of an input parameter is a correlation threshold, which can be used to include attributes in or exclude attributes from a transformation process based on their correlation with a response variable. For example, individual attributes may be sorted based on their correlation with the response variable, and only the attributes having a correlation above the correlation threshold may be included in a transformation process. Another example of an input parameter is a multicollinearity threshold, which can be used to control groupings of attributes. For instance, the multicollinearity threshold may be used to prevent the transformation module from combining certain attributes into a transformed attribute if the multicollinearity of those attributes is greater than the multicollinearity threshold.

Examples of Use Cases

In an example of a process flow that involves credit-related attributes, the process can involve preparing input data by grouping raw data (e.g., tradeline data) into training data that include attributes. The different types of attributes include credit risk attributes, new account attributes, spending attributes, activity attributes, and attributes associated with credit line increases. The process can also involve generating transformed attributes, as described above with respect to FIGS. 2-5. The process can also involve using an automated model development tool to build or train a logistic regression model or other suitable modeling algorithm using the transformed attributes, the original attributes, or some combination thereof.

In an example of a use case, introducing transformed attributes into credit modeling can provide improvements in model performance. The use case can involve a benchmark model, such as a logistic regression model using ADA and DIM attributes. The use case can also involve building transformed attributes on top of these existing attributes (e.g., ADA, DIM, etc.) and using both transformed attributes and existing attributes to construct a logistic regression model. The performance of a model with transformed attributes can be compared to the performance of the benchmark model in terms of KS score and "bad capture rate" ("CR").

The sample use case involves constructing two-dimensional transformed attributes. In this two-dimensional use case, the number of possible two-dimensional combinations of over 500 ADA attributes plus over 500 DIM attributes exceeds 500,000. The transformation module 108 can use certain criteria to select and retain certain transformed attributes having more significance. The criteria can include excluding attributes with too many missing values (e.g., attributes with a missing value percentage greater than 80%), ranking existing attributes according to their correlation with a response variable (e.g., the top 100 attributes with the most correlation), and selecting two existing attributes if their correlation with one another is within a certain range (e.g., 0.2-0.8) indicating a sufficiently low multicollinearity. The resulting transformed attributes can have more predictive power than individual attributes. In some aspects, the use case identified above can improve model performance for the following credit modeling categories: credit risk, opening a new account, being an active customer, credit card spending, and credit line increases.

Example of a Computing Environment for Transformation Operations

Figure 6:
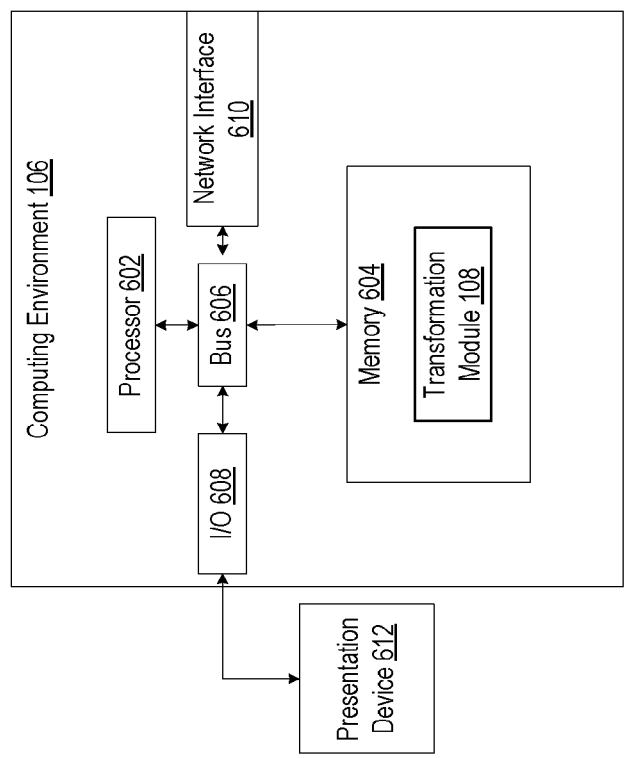
FIG. 6 depicts an example of a computing environment usable for implementing certain aspects of the present disclosure.

Any suitable computing system or group of computing systems can be used to perform the transformation operations described herein. For example, FIG. 6 is a block diagram depicting an example of a computing environment 106. The example of the computing environment 106 can include various devices for communicating with other devices in the computing system 100, as described with respect to FIG. 1. The computing environment 106 can include various devices for performing one or more transformation operations described above with respect to FIGS. 1-5.

The computing environment 106 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means, including memory sharing, message passing, token passing, or network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor 602 to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Examples of a computer-readable medium include a magnetic disk, memory chip, optical storage, flash memory, storage class memory, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing environment 106 may also include a number of external or internal devices such as input or output devices. For example, the computing environment 106 is shown with an input/output interface 608 that can receive input from input devices or provide output to output devices. A bus 606 can also be included in the computing environment 106. The bus 606 can communicatively couple one or more components of the computing environment 106.

The computing environment 106 can execute program code that includes the transformation module 108. The program code for the transformation module 108 may be resident in any suitable computer-readable medium and may be executed on any suitable processing device. For example, as depicted in FIG. 6, the program code for the transformation module 108 can reside in the memory 604 at the computing environment 106. Executing the transformation module 108 can configure the processor 602 to perform the operations described herein.

In some aspects, the computing environment 106 can include one or more output devices. One example of an output device is the network interface device 610 depicted in FIG. 6. A network interface device 610 can include any device or group of devices suitable for establishing a wired or wireless data connection to one or more data networks 104. Examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Examples of the presentation device 612 include a touchscreen, a monitor, a speaker, a separate mobile computing device, etc.

General Considerations

Numerous specific details are set forth herein to provide a thorough understanding of the disclosure. Those skilled in the art will understand that the claimed subject matter may be practiced without these specific details. In other instances, features that would be known by one of ordinary skill have not been described in detail so as not to obscure claimed subject matter.

Unless specifically stated otherwise, throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "configured to" herein is meant as open and inclusive language that does not foreclose devices configured to perform additional tasks or steps. The use of "based on" is meant to be open and inclusive, in that an action "based on" one or more recited conditions or values may, in practice, be based on additional conditions or values beyond those recited. Headings, lists, and numbering included herein are for ease of explanation only and are not meant to be limiting.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable language or combinations of languages may be used to implement this disclosure in software to be used in programming or configuring a computing device.

Aspects disclosed herein may be performed in the operation of such computing devices. The order of the blocks presented in the examples above can be varied—for example, blocks can be re-ordered, combined, broken into sub-blocks, or performed in parallel. While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising:
a processing device; and
one or more memory devices storing:
   instructions executable by the processing device,
   a machine-learning model that is a memory structure comprising input nodes interconnected with one or more output nodes via intermediate nodes, wherein the intermediate nodes are configured to transform input attribute values into a predictive or analytical output value for an entity associated with the input attribute values, and
   training data for training the machine-learning model, wherein the training data are grouped into attributes;
wherein the processing device is configured to access the one or more memory devices and thereby execute the instructions to:
   select a subset of attributes from the attributes of the training data;
   transform the subset of attributes into a transformed attribute by performing operations comprising:
      grouping (a) a first portion of the training data for the subset of attributes into a first multi-dimensional bin and (b) a second portion of the training data for the subset of attributes into a second multi-dimensional bin, wherein a dimension for each multi-dimensional bin corresponds to an attribute range of a respective one of the attributes in the subset of attributes,
      computing a first set of interim predictive output values for a first attribute in the subset of attributes, wherein the first set of interim predictive output values is generated from a first subset of the training data within a first range of the attribute ranges,
      computing a first set of smoothed interim output values by applying a smoothing function to the first set of interim predictive output values,
      computing a second set of interim predictive output values for a second attribute in the subset of attributes, wherein the second set of interim predictive output values is generated from a second subset of the training data within a second range of the attribute ranges,
      computing a second set of smoothed interim output values by applying the smoothing function to the second set of interim predictive output values, and
      outputting a dataset for the transformed attribute, the dataset having, at least, a first dimension including the first set of smoothed interim output values and a second dimension including the second set of smoothed interim output values; and
   train the machine-learning model with the transformed attribute.

2. The system of claim 1, wherein the smoothing function comprises an isotonic regression formula.

3. The system of claim 1, wherein the processing device is further configured to execute the instructions to receive a monotonicity constraint that is applied to the machine-learning model, wherein one or more attributes in the subset of attributes violate the monotonicity constraint, and wherein the smoothing function is configured to cause the smoothed interim predictive output values to comply with the monotonicity constraint.

4. The system of claim 1, wherein the processing device is configured to select the subset of attributes by performing operations comprising, for a particular attribute from the subset of attributes:
retrieving, from the training data, data samples including values for the particular attribute and corresponding values for a response variable;
computing a correlation between the data samples having the values for the particular attribute and the corresponding values for the response variable; and
including the particular attribute in the subset of attributes based on the correlation exceeding a threshold correlation indicative of monotonicity between the particular attribute and the response variable.

5. The system of claim 1, wherein the processing device is configured to exclude a particular attribute from the subset of attributes by performing operations comprising:
identifying a time period having a plurality of intervals;
determining that the particular attribute lacks data values for a subset of intervals from the plurality of intervals; and
excluding the particular attribute from the subset of attributes based on the subset of intervals having missing data values exceeding a threshold number of interval.

6. The system of claim 1, wherein the processing device is configured to select the subset of attributes by performing operations comprising, for a first attribute and a second attribute from the subset of attributes:
retrieving, from the training data, first data samples including values for the first attribute and second data samples including values for the second attribute;
computing a correlation between the first data samples and the second data samples; and
including the first attribute and the second attribute in the subset of attributes based on the correlation being less than a threshold correlation indicative of multicollinearity between the first attribute and the second attribute.

7. The system of claim 1, wherein the processing device is configured to compute a particular interim predictive output value for a particular multi-dimensional bin by performing operations comprising:
computing, for combinations of attribute values in the particular multi-dimensional bin, respective probabilities of an outcome; and
averaging the probabilities to obtain the particular interim predictive output value.

8. A method comprising:
accessing, from a non-transitory computer-readable medium, (i) a machine-learning model that transforms input attribute values into a predictive or analytical output value for an entity associated with the input attribute values and (ii) training data for training the machine-learning model, wherein the training data are grouped into attributes;
selecting, by a processing device, a subset of attributes from the attributes of the training data;
transforming, by the processing device, the subset of attributes into a transformed attribute by performing operations comprising:
grouping (a) a first portion of the training data for the subset of attributes into a first multi-dimensional bin and (b) a second portion of the training data for the subset of attributes into a second multi-dimension bin wherein a dimension for each multi-dimensional bin corresponds to an attribute range of a respective on of the attributes in the subset of attributes,
computing a first set of interim predictive output values for a first attribute in the subset of attributes, wherein the first set of interim predictive output values is generated from a first subset of the training data within a first range of the attribute ranges,
computing a first set of smoothed interim output values by applying a smoothing function to the first set of interim predictive output values,
computing a second set of interim predictive output values for a second attribute in the subset of attributes, wherein the second set of interim predictive output values is generated from a second subset of the training data within a second range of the attribute ranges,
computing a second set of smoothed interim output values by applying the smoothing function to the second set of interim predictive output values, and
outputting a dataset for the transformed attribute, the dataset having, at least, a first dimension including the first set of smoothed interim output values and a second dimension including the second set of smoothed interim output values; and
training, by the processing device, the machine-learning model with the transformed attribute.

9. The method of claim 8, wherein the smoothing function comprises an isotonic regression formula.

10. The method of claim 9, further comprising receiving a monotonicity constraint that is applied to the machine-learning model, wherein one or more attributes in the subset of attributes violates the monotonicity constraint, and wherein applying the smoothing function causes the smoothed interim predictive output values to comply with the monotonicity constraint.

11. The method of claim 8, wherein selecting the subset of attributes comprises performing, by the processing device and for a particular attribute from the subset of attributes, operations comprising:
retrieving, from the training data, data samples including values for the particular attribute and corresponding values for a response variable;
computing a correlation between the data samples having the values for the particular attribute and the corresponding values for the response variable; and
including the particular attribute in the subset of attributes based on the correlation exceeding a threshold correlation indicative of monotonicity between the particular attribute and the response variable.

12. The method of claim 8, further comprising excluding, by the processing device, a particular attribute from the subset of attributes by performing operations comprising:
identifying a time period having a plurality of intervals;
determining that the particular attribute lacks data values for a subset of intervals from the plurality of intervals; and
excluding the particular attribute from the subset of attributes based on the subset of intervals having missing data values exceeding a threshold number of intervals.

13. The method of claim 8, wherein selecting the subset of attributes comprises performing, by the processing device and for a first attribute and a second attribute from the subset of attributes, operations comprising:
retrieving, from the training data, first data samples including values for the first attribute and second data samples including values for the second attribute;

computing a correlation between the first data samples and the second data samples; and including the first attribute and the second attribute in the subset of attributes based on the correlation being less than a threshold correlation indicative of multicollinearity between the first attribute and the second attribute.

14. The method of claim 8, further comprising computing, by the processing device, a particular interim predictive output value for a particular multi-dimensional bin by performing operations comprising:

computing, for combinations of attribute values in the particular multi-dimensional bin, respective probabilities of an outcome; and averaging the probabilities to obtain the particular interim predictive output value.

15. A non-transitory computer-readable medium in which instructions executable by a processing device are stored for causing the processing device to:

access (i) a machine-learning model that is a memory structure comprising input nodes interconnected with one or more output nodes via intermediate nodes, wherein the intermediate nodes are configured to transform input attribute values into a predictive or analytical output value for an entity associated with the input attribute values and (ii) training data for training the machine-learning model, wherein the training data are grouped into attributes;

select a subset of attributes from the attributes of the training data;

transform the subset of attributes into a transformed attribute by performing operations comprising:

grouping (a) a first portion of the training data for the subset of attributes into a first multi-dimensional bin and (b) a second portion of the training data for the subset of attributes into a second multi-dimension bin, wherein a dimension for each multi-dimensional bin corresponds to an attribute range of a respective one of the attributes in the subset of attributes, computing a first set of interim predictive output values for a first attribute in the subset of attributes, wherein the first set of interim predictive output values is generated from a first subset of the training data within a first range of the attribute ranges, computing a first set of smoothed interim output values by applying a smoothing function to the first set of interim predictive output values, computing a second set of interim predictive output values for a second attribute in the subset of attributes, wherein the second subset of interim predictive output values is generated from a second subset of the training data within a second range of the attribute ranges, computing a second set of smoothed interim output values by applying the smoothing function to the second set of interim predictive output values, and outputting a dataset for the transformed attribute, the dataset having, at least, a first dimension including the first set of smoothed interim output values and a second dimension including the second set of smoothed interim output values; and train the machine-learning model with the transformed attribute.

16. The non-transitory computer-readable medium of claim 15, wherein the smoothing function comprises an isotonic regression formula.

17. The non-transitory computer-readable medium of claim 16, wherein the instructions, when executed the processing device, cause the processing device to receive a monotonicity constraint that is applied to the machine-learning model, wherein one or more attributes in the subset of attributes violate the monotonicity constraint, and wherein the smoothing function is configured to cause the smoothed interim predictive output values to comply with the monotonicity constraint.

18. The non-transitory computer-readable medium of claim 15, wherein the instructions, when executed the processing device, cause the processing device to select the subset of attributes by performing operations comprising, for a particular attribute from the subset of attributes:

retrieving, from the training data, data samples including values for the particular attribute and corresponding values for a response variable;

computing a correlation between the data samples having the values for the particular attribute and the corresponding values for the response variable; and including the particular attribute in the subset of attributes based on the correlation exceeding a threshold correlation indicative of monotonicity between the particular attribute and the response variable.

19. The non-transitory computer-readable medium of claim 15, wherein the instructions, when executed the processing device, cause the processing device to select the subset of attributes by performing operations comprising, for a first attribute and a second attribute from the subset of attributes:

retrieving, from the training data, first data samples including values for the first attribute and second data samples including values for the second attribute;

computing a correlation between the first data samples and the second data samples; and including the first attribute and the second attribute in the subset of attributes based on the correlation being less than a threshold correlation indicative of multicollinearity between the first attribute and the second attribute.

20. The non-transitory computer-readable medium of claim 15, wherein the instructions, when executed the processing device, cause the processing device to compute a particular interim predictive output value for a particular multi-dimensional bin by performing operations comprising:

computing, for combinations of attribute values in the particular multi-dimensional bin, respective probabilities of an outcome; and averaging the probabilities to obtain the particular interim predictive output value.

* * * * *

UNITED STATES PATENT AND TRADEMARK OFFICE
CERTIFICATE OF CORRECTION

Page 1 of 1

PATENT NO. : 10,643,154 B2
APPLICATION NO. : 16/334190
DATED : May 5, 2020
INVENTOR(S) : Trevis J. Litherland, Li Hao and Rajkumar Bondugula It is certified that error appears in the above-identified patent and that said Letters Patent is hereby corrected as shown below:

On the Title Page

Item (72), please delete "AR" and insert in its place -- AZ --.

Signed and Sealed this
Thirtieth Day of June, 2020

Andrei Iancu
*Director of the United States Patent and Trademark Office*